(12) United States Patent
Chairat et al.

(10) Patent No.: US 8,936,745 B2
(45) Date of Patent: *Jan. 20, 2015

(54) METHOD FOR MANUFACTURING ELECTRICALLY NON-CONDUCTIVE PAINTED SUBSTRATE

(75) Inventors: Claire Chairat, Salon de Provence (FR); Olivier Burel, Bouc Bel Air (FR); Jean-Marc Berthier, Lambesc (FR)

(73) Assignee: Airbus Helicopters, Marignane Cedex (FR)

( * ) Notice: Subject to any disclaimer, the term of this patent is extended or adjusted under 35 U.S.C. 154(b) by 999 days.

This patent is subject to a terminal disclaimer.

(21) Appl. No.: 12/993,156

(22) PCT Filed: May 14, 2009

(86) PCT No.: PCT/FR2009/000570
§ 371 (c)(1),
(2), (4) Date: Feb. 1, 2011

(87) PCT Pub. No.: WO2009/150316
PCT Pub. Date: Dec. 17, 2009

(65) Prior Publication Data
US 2011/0115131 A1 May 19, 2011

(30) Foreign Application Priority Data
May 19, 2008 (FR) .................................. 08 02677

(51) Int. Cl.
*B29C 33/58* (2006.01)
*B29C 37/00* (2006.01)
(Continued)

(52) U.S. Cl.
CPC ........... *B29C 37/0032* (2013.01); *B29C 41/006* (2013.01); *B29C 41/08* (2013.01); *B29C 33/58* (2013.01); *B29C 37/0067* (2013.01); *B29C 2037/0039* (2013.01)
USPC ........ 264/438; 264/259; 264/271.1; 264/279; 427/133; 427/203; 427/205; 427/470; 427/474; 427/485

(58) Field of Classification Search
USPC ............... 264/438, 271.1, 279, 259; 427/133, 427/203, 205, 470, 474, 485
See application file for complete search history.

(56) References Cited

U.S. PATENT DOCUMENTS 4,316,869 A * 2/1982 Van Gasse ..................... 264/255
4,592,930 A * 6/1986 Schmidt et al. ............... 427/133
(Continued)

FOREIGN PATENT DOCUMENTS

EP 0698476 A1 2/1996
EP 698476 A1 * 2/1996
(Continued)

OTHER PUBLICATIONS

Search Report and Written Opinion; Application No. PCT/FR2009/000570; dated May 14, 2009.
(Continued)

Primary Examiner — Atul P. Khare
(74) Attorney, Agent, or Firm — Brooks Kushman P.C.

(57) ABSTRACT

The present invention relates to a method of fabricating a painted substrate (30) using powder paint (21), said substrate being electrically insulating, during which method the following steps are performed in succession: a) a treatment coating (10) is placed on a mold (1), said treatment coating (10) including at least one preparation layer (11, 12) based on an unmolding agent (15, 15') in contact with said mold (1); b) said treatment coating (10) is electrostatically covered with powder paint (21) in such a manner that said powder paint (21) is attracted towards said mold (1) and is held against the treatment coating (10); c) said powder paint (21) is transformed at least in part in order to obtain a sheet (20) of powder paint (21); and d) said substrate (30) is prepared on said sheet (20) in order to obtain said painted substrate.

12 Claims, 1 Drawing Sheet

(51) Int. Cl.
*B29C 41/00* (2006.01)
*B29C 41/08* (2006.01)

(56) References Cited

U.S. PATENT DOCUMENTS

| | | | |
|---|---|---|---|
| 4,681,712 A | | 7/1987 | Sakakibara et al. |
| 5,480,726 A | * | 1/1996 | Richart .................. 428/482 |
| 6,235,228 B1 | * | 5/2001 | Nicholl et al. ............ 264/255 |
| 6,896,834 B2 | | 5/2005 | Packer et al. |
| 2002/0012754 A1 | * | 1/2002 | Yamamura et al. ......... 427/487 |
| 2003/0049413 A1 | | 3/2003 | Packer et al. |
| 2005/0133959 A1 | * | 6/2005 | Sroka ..................... 264/245 |

FOREIGN PATENT DOCUMENTS

| | | | |
|---|---|---|---|
| EP | 0927082 B1 | | 7/1999 |
| FR | 2180676 A | | 11/1973 |
| FR | 2247337 A1 | | 5/1975 |
| FR | 2683763 | | 5/1993 |
| GB | 1420867 A | * | 1/1976 |
| GB | 1479194 A | * | 7/1977 |
| WO | 9406611 A1 | | 3/1994 |

OTHER PUBLICATIONS

Chinese Office Action Translation for CN 200980118466.9, Completed by the Chinese Patent Office, Dated Oct. 23, 2012, 7 Pages.
Chinese Office Action Translation for CN 200980118465.4, Completed by the Chinese Patent Office, Dated Jun. 5, 2014, 7 Pages.
Chinese Office Action Translation for CN 200980118465.4, Completed by the Chinese Patent Office, Dated Dec. 12, 2012, 8 Pages.
Korean Office Action Translation for KR 10-2010-7027257, Completed by the Korean Patent Office, Dated Jul. 20, 2012, 2 Pages.
Korean Office Action Translation for KR-10-2010-7027258, Completed by the Korean Patent Office, Dated Jul. 27, 2012, 2 Pages.
Australia Notice of Entitlement, for Australian Application No. 2009256499, Completed by the Australian Patent Office, Dated Mar. 21, 2012, 1 Page.
Australia Notice of Entitlement, for Australian Application No. 2009256500, Completed by the Australian Patent Office, Dated Mar. 9, 2012, 1 Page.
European Notification for EP 09761867.2, Completed by the European Patent Office, Date Oct. 15, 2012, 30 Pages.
European Notification for EP 09761868.0, Completed by the European Patent Office, Dated Aug. 28, 2012, 5 Pages.

* cited by examiner

US 8,936,745 B2

METHOD FOR MANUFACTURING ELECTRICALLY NON-CONDUCTIVE PAINTED SUBSTRATE

CROSS REFERENCE TO RELATED APPLICATIONS

This application is the U.S. national phase of PCT application No. PCT/FR2009/000570 filed May 14, 2009, which claims priority to French patent application No. FR 0802677, filed May 19, 2008.

FIELD OF THE INVENTION

The present invention relates to a method of fabricating a painted substrate that is electrically non-conductive, i.e. an insulating substrate made of plastics or composite materials.

The invention thus lies in the narrow field of methods of painting non-metallic parts that are electrically non-conductive, and more particularly substrates of plastics or composite materials.

BACKGROUND OF THE INVENTION

Usually, a paint comprises three components, namely a pigment, a binder, and a solvent.

The pigment provides the color, appearance, opaqueness, and certain special properties of the paint, the binder is a macromolecular substance for bonding together the pigments and fillers for keying the paint on the substrate, and the solvent serves to dissolve the binder and to facilitate application of the paint by adjusting the viscosity and the rate of evaporation of said solvent. Once deposited on the substrate that is to be painted, the solvent evaporates and the paint polymerizes or is transformed by chemical bonding.

Unfortunately, the solvents used generally include volatile organic components that are dangerous for humans and the environment. Environmental standards are becoming ever more severe, so it is appropriate to use paints that are not polluting.

It is then possible to envisage using paints in which the solvent is water. Nevertheless, such paints sometimes contain additives, of the glycol ether type, that are harmful for the environment.

Consequently, another type of paint has been implemented, namely powder paints. Powder paints are powdery materials in the form of thermoplastic or thermosetting powders that do not contain any solvents.

The powder paint is then deposited on the substrate for painting and the powder is then transformed into a sheet of paint by a thermal effect, e.g. by baking in an oven. When the substrate for painting is a metal, the person skilled in the art charges the powder paint electrically and then applies it to the substrate for painting. The substrate is electrically charged with a polarity opposite to that of the powder paint, so the paint powder is attracted towards the substrate and adheres thereto temporarily.

Then, by heating the powder paint, e.g. by stoving, the powder paint is caused to melt and then to harden so as to form a sheet of paint covering the substrate.

That method is very effective, but it is unsuitable as it stands for use with electrically non-conductive substrates, i.e. substrates made of thermosetting composite materials, or thermoplastic materials, for example, or indeed plastics type materials.

Furthermore, the method requires the substrate for painting to be held by an end of its outside surface. That method is therefore unsuitable for parts that do not have any surface that can be left unpainted, or parts that are to be completely covered in paint.

In a first method of applying powder paint on an electrically non-conductive material, a conductive material, e.g. graphite, is included in the substrate for painting in order to improve its conductivity.

In a second method, the substrate is covered in an electrically conductive primer layer. The powder paint can then adhere to the substrate via its primer layer.

That method satisfies requirements by enabling non-polluting powder paint to be used on a substrate that is electrically non-conductive.

Nevertheless, the primer layer used may itself possibly be harmful for the environment. In addition, the primer layer imparts an electrically conductive nature to the substrate for painting, and this characteristic may be unacceptable, depending on the use to which the substrate is to be put.

Consequently, a third method is known seeking to remedy that drawback by avoiding giving an electrically conductive nature to a substrate that is to remain electrically neutral.

According to document EP 0 927 082, an electrically conductive primer layer is applied to the substrate for painting, e.g. using a spray gun, and it is then covered in powder paint.

A heating cycle is then performed serving to bake the powder paint. In addition, because of the nature of the primer layer, the painted substrate returns to being non-conductive at the end of the heating cycle.

Although effective, it is found that that third method still requires the use of primer layers.

Furthermore, document FR 2 180 676 presents a method of varnishing a molded part, and document EP 0 698 476 relates to applying a coating referred to as a "gel-coat" on a molded composite sheet. Those documents are thus remote from the invention.

SUMMARY OF THE INVENTION

An object of the present invention is thus to propose a method of painting that avoids the above-mentioned limitations, the painting method not making use of substances that are harmful for the environment.

According to the invention, a method of fabricating an electrically insulated painted substrate is remarkable in that the following steps are performed in succession:

a) depositing a treatment coating on a mold during this step a), said treatment coating comprising first and second preparation layer based on an unmolding agent, placing a first preparation layer based on unmolding agent on said mold, then polymerizing said first preparation layer based on unmolding agent prior to covering it with a second preparation layer based on unmolding agent;

b) electrostatically covering said treatment coating with powder paint in such a manner that said powder paint is attracted to said mold and is held against the treatment coating;

c) transforming said powder paint at least in part in order to obtain a sheet of paint, i.e. a layer of paint that is pre-hardened and uniform; and d) preparing said substrate, i.e. the body of the substrate, on said sheet in order to obtain said painted substrate.

Surprisingly, the powder paint hardens and adheres well to the substrate, chemical bonds being created between the powder paint and the substrate.

It should be observed that the method of the invention does not imply using a conductive primer layer between the electrically non-conductive substrate and the powder paint.

The invention goes against prejudices that have previously been dominant by applying the powder paint against the treatment coating of a mold and not against the substrate for painting, which, at first glance, appears nonsensical. In the invention, a painted substrate is made by preparing the substrate directly on a sheet of paint, instead of making the substrate and then painting it.

This preparation of the substrate directly on a sheet of paint is original and innovative. The invention provides a method of fabricating a painted substrate as such, in contrast to the methods suggested by documents FR 2 180 676 and EP 0 698 476.

The absence of an electrically conductive primer layer and the absence of paint including solvent guarantees minimal impact on the environment.

Furthermore, the absence of an electrically conductive primer layer minimizes the weight of the painted substrate to a greater or lesser extent, depending on the dimensions of the substrate.

Finally, it should be observed that the method considerably reduces the substrate fabrication cycle by eliminating a step dedicated to the painting stage. The financial savings that result therefrom are not negligible.

Furthermore, the invention guarantees that the entire substrate is painted, since the substrate is not held by any of its ends in order to be painted.

Furthermore, the treatment coating deposited during step a) serves to obtain a better quality for the total layer of unmolding agent in the mold since the thickness and the distribution of the two layers are better controlled than they would be if a single thick layer were to be applied.

The invention may also include one or more of the following additional characteristics.

The powder paint may form part of the thermoplastic or thermosetting group of powder paints, and may for example be a paint of the epoxy, polyurethane, polyester, or indeed acrylic type.

In addition, the unmolding agent may be a substance based on silicone, a substance based on solvent, an aqueous substance, a substance of the siloxane type, or indeed a substance without solvent.

Furthermore, during step d), in a first technique, the substrate is optionally prepared by draping pre-impregnated composite-material fabrics on the top of the sheet of powder paint.

Thereafter, still during step d), after draping said pre-impregnated fabrics, the assembly comprising the mold, the treatment coating, the sheet of paint, and the composite materials of the substrate is heated in order to polymerize it and obtain the painted substrate.

In this way, said assembly is heated to a temperature lying in the range 80° C. to 400° C. so as to transform both the sheet of paint and the substrate, e.g. so as to polymerize them.

The composite materials used may comprise composites of the polyester epoxy, bismaleimide, phenolic, thermoplastic, or indeed thermosetting type, together with carbon, glass, aramid, or any other type of textile fibers.

It should be observed that the finished substrate is electrically insulating insofar as it does not conduct electricity. This characteristic is not incompatible with using carbon fibers since the carbon fibers end up being completely embedded in the resin.

In a second technique, during step d), the substrate is prepared by placing fibers onto the sheet of paint and then injecting thermosetting or thermoplastic resin that reacts in situ (a monomer is injected followed by catalyst), or else material is injected in the molten state at a temperature lying in the range 80° C. to 420° C.

The fibers used may be carbon, glass, aramid, or any other textile fiber.

Finally, in a third technique, during step d), the substrate is prepared by injecting plastics materials onto the sheet of paint at a temperature lying in the range 80° C. to 500° C.

The physical or chemical transformation implemented during step c), e.g. polymerization, is advantageously performed using conventional heater means of thermal, magnetic, or radiant type, e.g. by heating the mold by induction.

Nevertheless, this transformation that enables a sheet of paint to be obtained at least in part from powder paint may be performed using conventional techniques known to the person skilled in the art.

In addition, during step a), it is possible to envisage placing at least one preparation layer based on unmolding agent on the mold and then covering said preparation layer in a finishing layer based on varnish in order to finalize the treatment coating.

However, the treatment coating comprises a first layer of unmolding agent deposited on the mold and a second layer of unmolding agent covering said first layer of a molding agent. Consequently, during step a), it is possible to cover the second preparation layer in a finishing layer based on varnish in order to finalize the treatment.

Optionally, the powder paint and/or the finishing layer include(s) additives in order to impart particular characteristics to the painted substrate. By way of example, these additives may provide anti-impact, anti-lightning, anti-dirtying, or anti-UV characteristics to the painted substrate.

Furthermore, the mold and/or the treatment coating is/are provided with an electrically conductive element, and during step b), the electrically conductive element is charged electrically with a first polarity, using the techniques known to the person skilled in the art and the powder paint charged electrically with a second polarity of opposite sign to the first polarity is projected from the electrically conductive element so that the powder paint is attracted by the mold or by the treatment coating.

Contrary to the usual practice, in the claimed method, the powder paint is attracted to the mold and not against the substrate for painting.

Once the powder paint has been deposited in stable manner against the treatment coating, the substrate can then be prepared against the powder paint, e.g. by draping pre-impregnated composite material fabrics.

In a first embodiment, the mold is made of an electrically conductive material. The mold as such represents an electrically conductive element that is connected to a static electricity generator.

Thus, in a first variant of this first embodiment, the mold is optionally made of electrically conductive material forming part of the group comprising metallic materials. Consequently, such a mold optionally comprises steel, aluminum, invar, or any other electrically conductive metal alloy.

In contrast, in a second variant of this first embodiment, the mold is made of a composite material including electrically conductive fibers, e.g. carbon fibers, that project from said mold so as to be connected to a static electricity generator.

These electrically conductive fibers represent the electrically conductive element of the mold that is connected to a static electricity generator.

In a second embodiment, the treatment coating includes an electrically conductive element. There is then no longer any need for the mold to be electrically conductive insofar as the treatment coating is electrically charged in order to attract thereto particles of powder paint that have been electrically charged with a polarity opposite to the polarity of the treatment coating.

In a first variant of this second embodiment, at least one preparation layer based on unmolding agent includes an electrically conductive element.

In a second variant of this second embodiment, the treatment coating includes a finishing layer based on varnish that is deposited during step a) on said at least one preparation layer based on unmolding agent of the treatment coating, the varnish-based finishing layer being provided with an electrically conductive element.

Whatever the variant of this second embodiment, the electrically conductive element comprises nanofillers with a thickness of nanometer order and a length of micrometer order, these nanofillers providing electrical continuity within the treatment coating by a "tiling" effect.

Consequently, each piece of nanofiller overlaps an adjacent piece so as to cover it in part, like tiles cover one another in part, so as to constitute a continuous electrically conductive layer within the treatment coating.

This technology makes it possible to have an electrically conductive layer of nanofillers with a thickness that is very small and to obtain additional characteristics such as good sealing.

At least a portion of the treatment coating may be chemically bonded to the powder paint at the end of the method, and this electrically conductive layer of nanofillers may thus cover the painted substrate at the end of said method.

BRIEF DESCRIPTION OF THE DRAWINGS

The invention and its advantages appear in greater detail from the following description of embodiments given by way of illustration with reference to the accompanying figures, in which.

DETAILED DESCRIPTION OF THE PREFERRED EMBODIMENT

Elements present in more than of the figures are given the same references in each of them.

Figure 1:
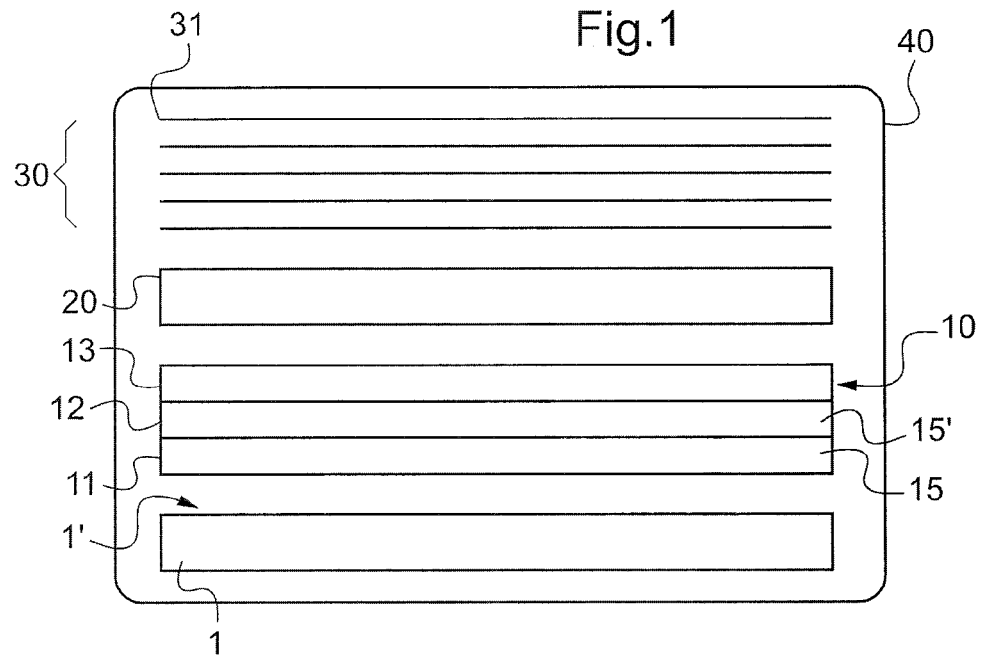
FIG. 1 is a diagrammatic view explaining the method of the invention.

FIG. 1 is a diagrammatic view for explaining the method of the invention.

Firstly, during a step a), an operator proceeds to place a treatment coating 10 on a mold 1.

Initially, the mold 1 is readied by depositing a first preparation layer 11 of the treatment coating 10 on an inside face 1' of the mold 1.

The first preparation layer is then made using a conventional type of unmolding agent 15.

The treatment coating 10 also includes in succession a second preparation layer 12 of unmolding agent 15' of the usual type. The unmolding agents 15 and 15' of the first and second preparation layers 11, 12 may be different, depending on requirements.

In this configuration, during step a), when the first preparation layer 11 is deposited against the inside face 1' of the mold, the operator heats said first preparation layer 11 in order to transform it, e.g. to polymerize it.

Thereafter, still during step a), the operator applies the second preparation layer 12 against the first preparation layer 11.

Similarly, it is possible to terminate the treatment surface 10 by spreading a finishing layer 13 based on varnish 16 over the first preparation layer 11, or the second preparation layer 12, as appropriate, and as shown in FIG. 1.

At the end of this first step a), the operator has thus deposited a treatment coating 10 on the mold 1.

The operator then performs step b) of the method.

During step b), the operator electrostatically covers the treatment coating 10 with a paint 21 in powder form.

The powder paint 21, attracted by the mold 1 or the treatment coating 10, constitutes a surface that is substantially plane.

During a step c), the operator transforms the sheet 20 of powder paint completely or partially depending on requirements in order to make it stable.

For example, the operator polymerizes the powder paint by heating it so as to obtain a sheet of paint, i.e. a layer of paint that is at least pre-hardened and uniform.

The sheet 20 is then shaped on the mold 1 and therefore has substantially the same shape as the mold 1. Thus, the sheet 20 of paint represents a surface on which the operator can prepare the substrate 30 constituting the part for painting.

During a step d) following the at least partial transformation of the powder paint into a sheet 20 of paint, the operator sets up the substrate 30 directly on the sheet 20. The substrate takes on the shape of the sheet 20 of paint and consequently the shape of the mold 1.

In order to make up the substrate in a first technique, the operator drapes a plurality of composite material fabrics 31 on the sheet 20 of powder paint 21.

Once draping has been completed, the operator places the assembly comprising the mold 1, the treatment coating 10, the paint sheet 20, and the composite materials constituting the substrate 30 in a vacuum bag 40 e.g. so that the fabric 31 and the sheet 20 of powder paint 21 take the required shape of the mold 1.

To finish, the operator uses conventional means to heat said assembly comprising the mold 1, the treatment coating 10, the paint sheet 20, and the composite materials constituting the substrate 30 up to a temperature lying in the range 80° C. to 400° C.

At the end of step d), the operator unmolds the painted substrate 30, said substrate 30 then being covered in a sheet of powder paint.

In a second technique that is not shown in the figure, the operator places fibers, e.g. glass fibers, on top of the sheet 20 of paint and then closes the mold 1 with a top shell that has the shape of the substrate that is to be obtained.

Once the mold has been closed, the operator injects hot resin between the sheet 20 of paint and said top shell.

On cooling, a painted substrate is obtained, said substrate including fibers embedded in the resin.

In a third technique that is not shown in the figure, the operator closes the mold 1 with a top shell having the shape of the substrate to be obtained, and then injects hot plastics material between the sheet 20 of paint and said top shell.

Figure 2:
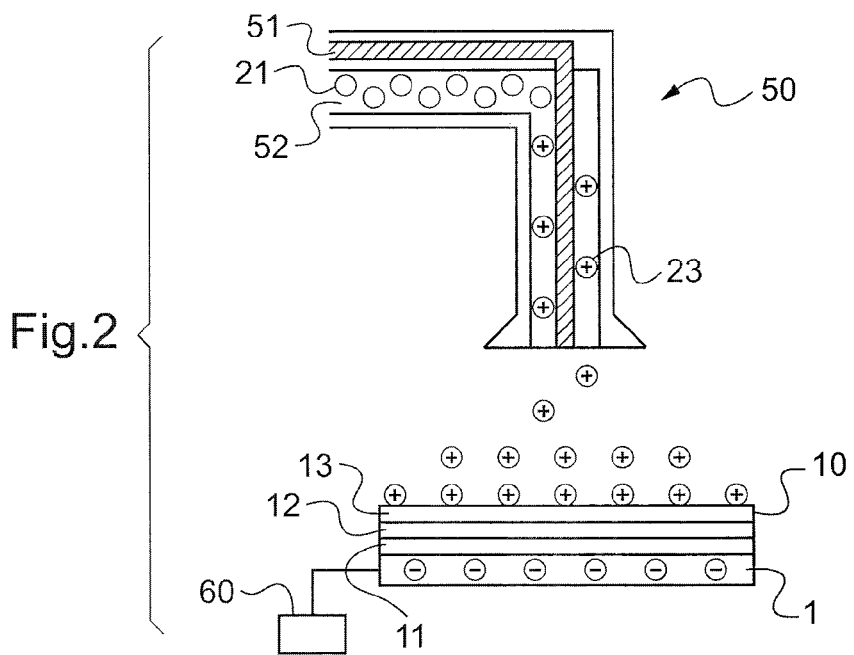
FIG. 2 is a view explaining step b) of the method in a first embodiment.

FIG. 2 shows step b) of the method in greater detail.

In order to cover the treatment surface 10 electrostatically, the operator charges an electrically conductive element of the mold 1 or the treatment coating 10 to a first polarity by connecting it to a static electricity generator 60.

In the first embodiment shown in FIG. 2, the mold 10 is provided with said electrically conductive element connected to the static electricity generator 60.

For example, the mold 1 is a metal mold, thereby giving it the required electrical conductivity.

In another variant, the mold is made of a composite material having electrically conductive fibers, such as carbon fibers, and it is connected to ground 60. The electrically conductive fibers then constitutes the electrically conductive element of the mold 1.

Figure 3:
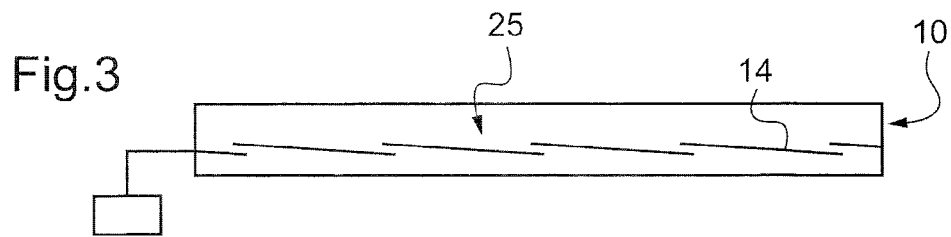
FIG. 3 is a diagrammatic view showing a treatment coating in a second embodiment.

In a second embodiment shown in FIG. 3, it is not the mold that includes the electrically conductive element, but the treatment coating 10.

Thus, the first preparation layer or the second preparation layer, or indeed the finishing layer, as appropriate, is provided with the electrically conductive element 14.

This electrically conductive element 14 possesses a plurality of electrically conducive nanofillers 25, with any nanofiller 25 partially covering another nanofiller and/or being partially covered by another nanofiller so as constitute the electrically conductive element that is connected to the static electricity generator 60.

With reference to FIG. 2, the powder paint 21 is projected using a paint gun 50.

The paint gun 50 has an electrical power supply 51 and a feed duct 52 for the electrically neutral particles 22 of powder paint.

Under the effect of the magnetic field that results from the electrical power supply 51, the particles become electrically charged with a second polarity of opposite sign to said first polarity.

Thus, paint particles 23 that are charged with a second polarity, e.g. a positive polarity, are expelled from the gun 50 and are attracted by the electrically conductive element of the mold 1 or of the treatment coating 10 that is electrically charged with a first polarity of sign opposite to that to the second polarity, i.e. negative polarity in this example.

Consequently, these particles 23 charged with a second polarity become deposited and held against the treatment coating 10.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

The invention claimed is:

1. A method of fabricating an electrically insulating substrate painted with powder paint, said method comprising the following steps performed in succession:
   a) forming a treatment coating on a mold, the treatment coating comprising first and second preparation layers each based on an unmolding agent, the treatment coating formed by placing the first preparation layer on the mold, then polymerizing the first preparation layer and then covering the first preparation layer with the second preparation layer, with at least one of the first and second preparation layers including an electrically conductive element;
   b) electrostatically covering the treatment coating with powder paint in such a manner that the powder paint is attracted to the mold and is held against the treatment coating;
   c) transforming the powder paint at least in part in order to obtain a sheet of powder paint; and
   d) preparing the electrically insulating substrate on the sheet of powder paint to form the electrically insulating substrate painted with powder paint.

2. The method according to claim 1, wherein the powder paint includes additives providing anti-impact, anti-lightning, anti-dirtying, or anti-UV characteristics to the painted substrate.

3. The method according to claim 1, further comprising covering the second preparation layer during step a) with a finishing layer based on varnish so as to finalize the treatment coating.

4. The method according to claim 3, wherein the finishing layer includes additives providing anti-impact, anti-lightning, anti-dirtying, or anti-UV characteristics to the painted substrate.

5. The method according to claim 1, further comprising charging the treatment coating during step b) with a first polarity and charging the powder paint during step b) with a second polarity of opposite sign to the first polarity so that the powder paint is attracted by the treatment coating during said electrostatic covering.

6. The method according to claim 1, wherein the electrically conductive element includes nanofillers of nanometer order thickness and micrometer order length, the nanofillers providing electrical continuity within the treatment coating by a tiling effect.

7. The method according to claim 1, wherein during step d), said preparing is conducted by draping a plurality of pre-impregnated composite-material fabric layers on the sheet of powder paint.

8. The method according to claim 7, wherein after said draping, an assembly comprising the mold, the treatment coating, the sheet of powder pain, and the composite-material fabric layers is heated so as to polymerize the composite-material fabric layers onto the sheet of powder paint and obtain the painted substrate.

9. The method according to claim 8, wherein said heating is conducted at a temperature lying in a range of 80° C. to 400° C.

10. The method according to claim 1, wherein during step d), said preparing is conducted by placing fibers over the sheet of powder paint and injecting resin.

11. The method according to claim 10, further comprising cooling after said injecting so as to obtain the painted substrate.

12. The method according to claim 1, wherein during step d), said preparing is conducted by injecting plastics material onto the sheet of powder paint.

* * * * *